Nov. 20, 1951 A. E. KILPELA 2,575,665
CLUTCH CONTROL FOR MARINE TRANSMISSION
Filed Nov. 13, 1943 2 SHEETS—SHEET 1

Inventor:
Ano E. Kilpela
By: Edward C. Gritzbaugh
Atty

Nov. 20, 1951  A. E. KILPELA  2,575,665
CLUTCH CONTROL FOR MARINE TRANSMISSION
Filed Nov. 13, 1943  2 SHEETS—SHEET 2

Inventor:
Aro E. Kilpela
By: Edward C. Gritzbaugh
Atty.

Patented Nov. 20, 1951

2,575,665

UNITED STATES PATENT OFFICE 2,575,665

CLUTCH CONTROL FOR MARINE TRANSMISSION

Ano E. Kilpela, Detroit, Mich., assignor to Borg-Warner Corporation, Chicago, Ill., a corporation of Illinois Application November 13, 1943, Serial No. 510,133

9 Claims. (Cl. 192—3.5)

The present invention relates to control means for certain types of transmission devices. More specifically the improvements are directed to a unitary control for shifting the gearing of a transmission apparatus and at the same time engaging and disengaging the elements of a clutch which couples a drive shaft to a driven shaft.

The control mechanism which is contemplated herein is especially adapted for maritime use for the purpose of driving the propeller of a boat in opposite directions to move the vessel ahead or astern.

One of the principal objects of the present invention is to simplify the construction of control means for a transmission and clutch such as contemplated herein, and to improve the operation and efficiency of such apparatus.

Another object of this invention is to provide simple and effective means in a control mechanism whereby, when the control lever is moved in one direction from a neutral position, the gears of the transmissions will be coupled up to the driven shaft slightly in advance of the clutch members becoming engaged thereby rotating the driven shaft in a given direction and when said control lever is moved in another direction from its neutral position the gears in the transmission will be again coupled up to the driven shaft slightly in advance of the clutch becoming engaged to effect a reverse rotation of the driven shaft. When the control lever is in its neutral position, the clutch members will be disengaged, and the driven shaft will be idle and disconnected from the drive shaft.

It is also an object of this invention to provide a novel cam structure for maintaining the clutch members disengaged while the control lever is in its neutral position, this cam structure being mounted upon and intimately associated with the fulcrum element for the control lever.

A further object is to provide a novel cam structure whereby the clutch members are held in a disengaged position through that portion of the control lever travel, from neutral to either one of its extreme positions, in which synchronization of the drive and driven elements of the synchronizer, followed by a partial engagement of the synchronizer clutch elements, takes place, and whereby the clutch members are allowed to engage while the control lever is moved to complete the engagement of the synchronizer clutch.

A further object is to provide novel means for moving the shift collar of the blocker synchronizer in a transmission assembly, and to support said means upon the fulcrum of the control lever to move therewith.

Additional objects, aims, and advantages of the present invention will be apparent to persons skilled in the art after the construction and operation of the improved transmission and clutch control structure is understood from the within description.

It is preferred to accomplish the numerous objects of this invention and to practice the same in substantially the manner hereinafter fully described and as particularly pointed out in the appended claims, reference being made to the accompanying drawings that form a part of this specification wherein:

Fig. 3 is a vertical section taken on the plane of line 3—3 on Fig. 2, looking in the direction of the arrows.

These drawings are to be understood as being more or less of a schematic character for the purpose of disclosing a typical or preferred embodiment of the improvements contemplated herein, and in these drawings like reference characters identify the same parts in the different views.

Figure 1:
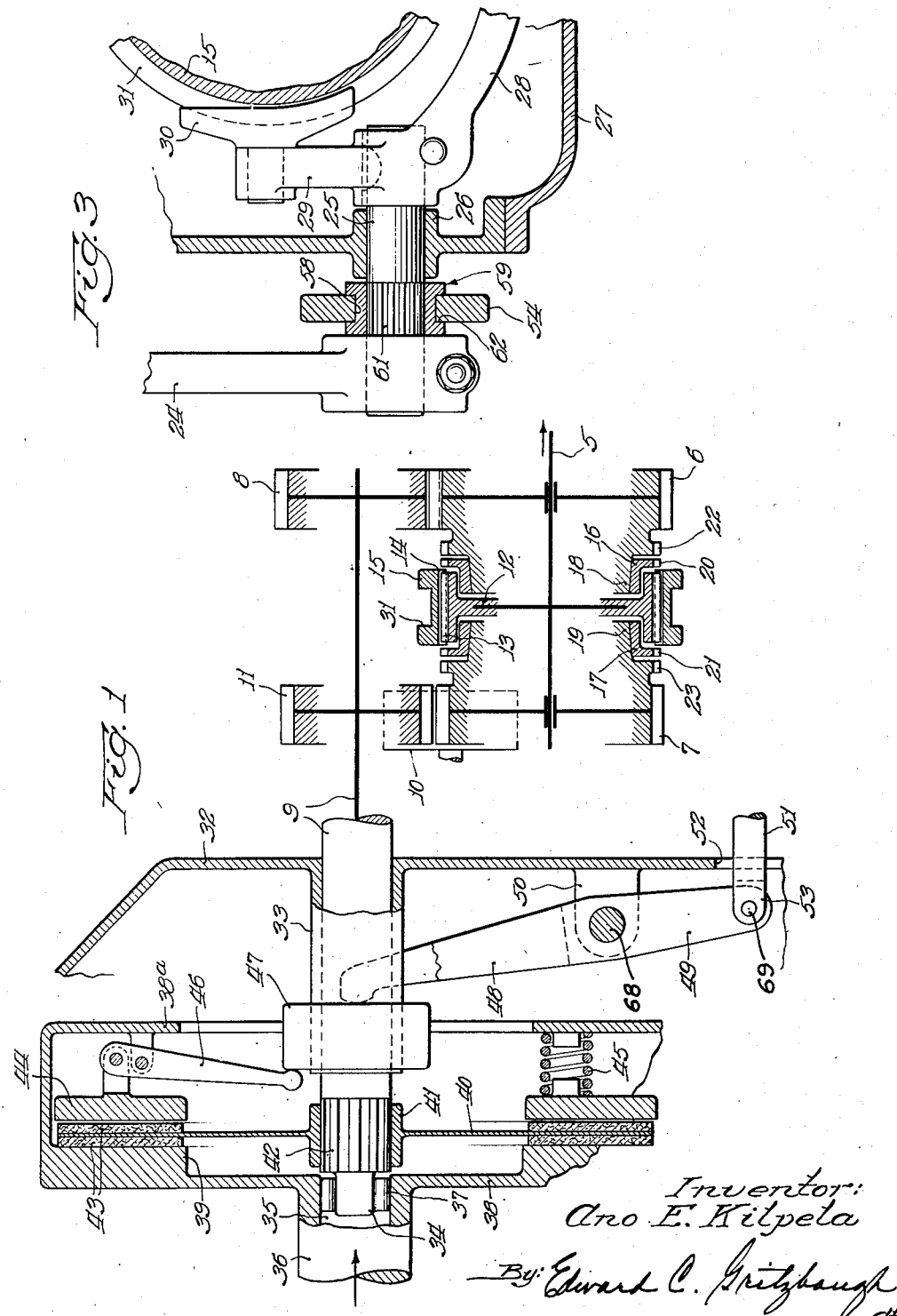
Fig. 1 is a schematic vertical section taken through the axes of the drive and driven shafts of a transmission and clutch assembly to which this invention may be applied.

The transmission assembly, shown at the right of Fig. 1, embodies the driven shaft 5 upon which spaced gears 6 and 7 are mounted for free rotation independent of driven shaft 5. The first gear 6 is for reverse drive with respect to the direction of rotation of the prime mover and is meshed with a companion gear 8 that is secured to the transmission drive shaft 9, the latter having its axis parallel to the driven shaft 5. The other gear 7 is for forward drive and is meshed with an idler pinion 10 that in turn is meshed with a second gear 11 secured to drive shaft 9 in axially spaced relation to gear 8.

To couple selectively gears 6 and 7 to driven shaft 5 transmission gear changing or shifting assembly employing a blocker type synchronizer is used. The blocker synchronizer structure, which is disposed between the gears 6 and 7, comprises a flanged centrally disposed hub 12 axially fixed to and rotatable with the driven shaft 5, said hub having external teeth 13 on its flange that engage the internal teeth 14 of the shift collar 15 to be driven by said collar and guide it in its sliding movement axially of the driven shaft axis. Blocker rings 16 and 17 are loosely mounted upon tapered synchronizing hubs 18 and 19 of the respective gears 6 and 7, and said rings have circumferentially disposed teeth 20 and 21, respectively, that are adapted initially to block the movement of internal teeth 14 of the shift collar when the latter is moved toward either of the main driving gears 6 and 7. After frictionally engaging one of the blocker rings 16 and 17 with its confronting tapered hub 18 or 19 so as to synchronize the rotation of the associated gear with the driven shaft 5, further sliding movement of the shift collar 15 will cause its teeth to pass through the teeth on the blocker rings and to mesh with clutch teeth 22 or 23 that are formed on the hubs of the main driving gears 6 and 7 thereby rotating the selected drive gear with the driven shaft 5 to transmit power from drive shaft 9 to the driven shaft 5 in the proper direction for forward or rearward movement of the vessel.

In neutral position, shift collar 15 is in the position shown in Fig. 1, and in this position teeth 14 are out of contact with clutch teeth 22 and 23.

The shift or control lever 24 (Figs. 2 and 3) is anchored at its lower end to the extended end portion of a fulcrum rod or a rock shaft 25 that is journaled in a bearing boss 26 on the transmission housing 27, and the inner end of said fulcrum rod 25 has the shift yoke 28 keyed to it whereby said yoke will be rocked whenever the shift lever 24 is moved out of its neutral position. Yoke 28 is formed with upstanding extensions 29 which pivotally support forks 30 that are disposed in diametrically opposite portions of the annular channel 31 on the outer face of the shift collar 15. When the shift lever 24 is moved out of neutral position toward either one of its other positions, the fulcrum rod 25 will rock the yoke 28 and its associated arms 29 and forks 30, which in turn will slide shift collar 15 to the right or left of the neutral position shown in Fig. 1 selectively to couple one of the gears 6, 7 to driven shaft 5.

An end portion of the transmission drive shaft 9 projects into a housing 32 and is rotatably journaled in an elongate bearing boss 33. The inner extremity of said shaft has a reduced stub end 34 that is piloted in a recess 35 in the adjacent end of a drive or power-receiving shaft 36 of a prime mover (not shown) and anti-friction elements 37 are interposed between the stub end and the recessed wall of the prime mover shaft 36 as shown at the left in Fig. 1. The flywheel 38 is mounted on and driven by shaft 36, and the clutch reaction face member 39 is formed as a part of said flywheel 38. A driven clutch plate 40 has its hub 41 slidably secured by splines 42 to the adjacent portion of the drive shaft 9 within clutch housing 38a and the friction facings 43 are carried by said plate 40 in opposition to the reaction face member 39. The movable pressure plate 44 of the clutch is disposed in confronting relation to the friction facings 43 toward which said plate is urged by a plurality of compression springs 45 that are interposed between the pressure plate 44 and the wall of the clutch housing 38a which is opposite clutch face 39.

While it is in neutral position, the pressure plate 44 is restrained against engagement with the friction facings 43 by the radially disposed release fingers 46 that are fulcrumed adjacent their outer ends on lugs upon the inner portion of the adjacent wall of the clutch housing 38a and have their shorter ends beyond their fulcrums pivotally connected to the pressure plate 44. The ends of the longer portions of these release fingers are engaged with the throw-out bearing 47 that is mounted on the boss 33 and is adapted for sliding movement longitudinally thereon.

The means for moving the throw-out bearing 47 comprises the forked end portion 48 of a shift lever 49 that is fulcrumed intermediate its ends on lugs 50 projecting from the wall of the housing 32. The fork 48 straddles boss 33 and its ends engage throw-out bearing 47. A coupling rod 51 passes through an opening 52 in housing 32 and has its forked end 53 pivotally connected to the adjacent end of the shift lever 49. The end of coupling rod 51 which is opposite the shift fork has an adjustable connection with a cam structure (Fig. 2) that is adapted, when the shift lever 24 is in neutral position, to maintain the clutch members in disengaged or inactive positions.

Figure 2:
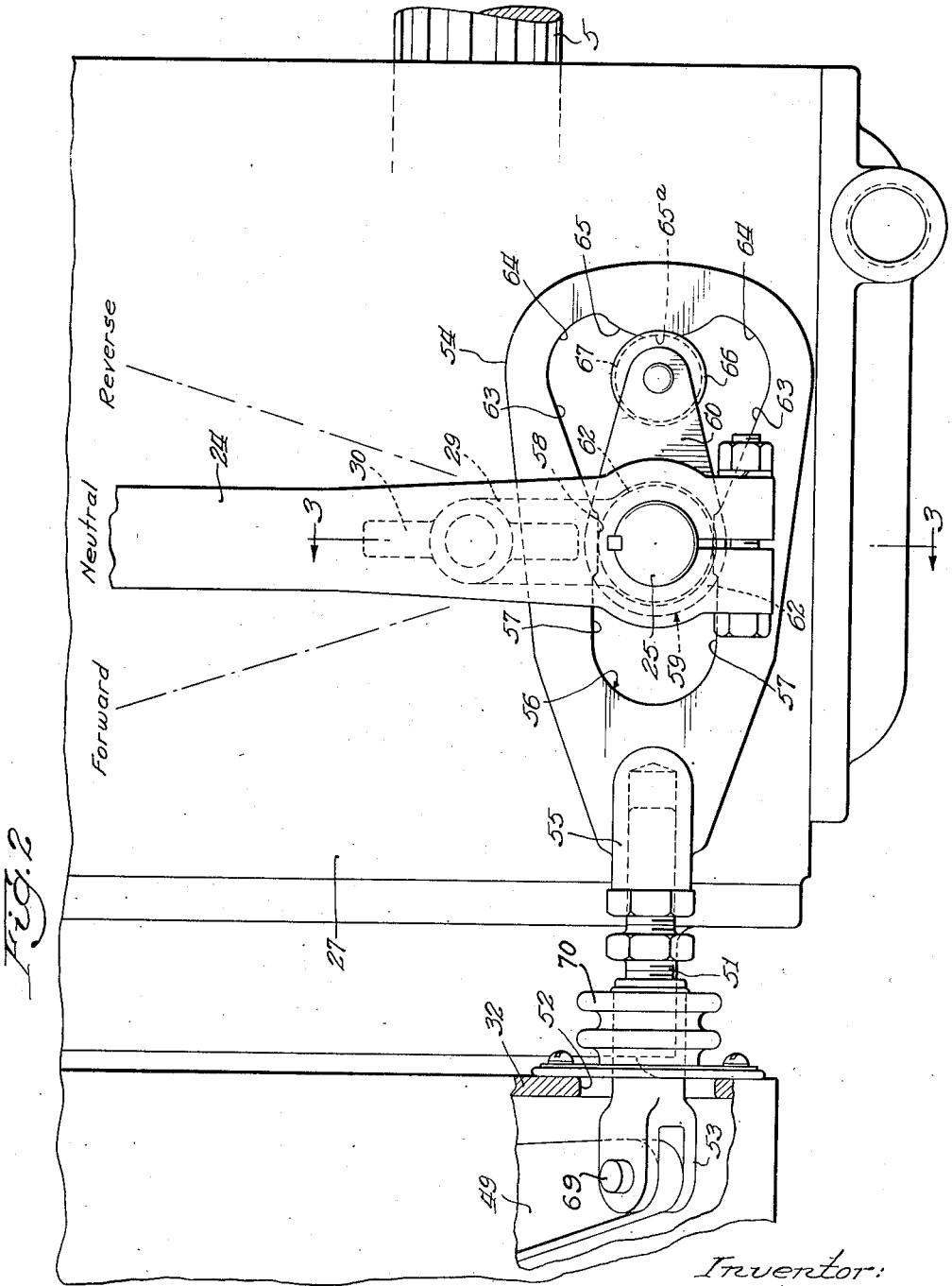
Fig. 2 is a fragmentary vertical elevation of a clutch and transmission assembly showing the cam control assembly and certain of the elements associated therewith.

The cam structure which is illustrated in enlarged detail in Fig. 2, is of the internal edge type preferably embodying an elongated plate 54 having a tapered end portion that is provided with a threaded socket 55 wherein the adjacent end of the coupling rod 51 is adjustably secured. This cam plate 54 is provided with a longitudinally extending opening identified generally as 56. The end portion of the cam opening which approaches the socket 55 has parallel side edges 57 that have opposing straight shoulders 58 functioning as guides for the cam plate 54 when the said plate moves in a direction transverse to the axis of the fulcrum rod 25 for the control shift lever 24. The end 59 (Fig. 3) of a relatively short rocker or follower arm 60 is anchored to the fulcrum rod 25 by any suitable means such as serrations 61 to cause said arm 60 to turn with the fulcrum rod. There is an annular channel 62 formed in the end 59 of rocker arm 60 for receiving and guiding the cam plate 54 through the medium of the parallel guides 58 on the cam plate whenever there is relative movement between the fulcrum rod 25 and the plate. The movement of the cam plate 54 as hereinafter described is such that it may be considered a second arm of the rock shaft 25.

The portion of the cam opening 56 in which the rocker arm 60 is disposed has outward diverging straight edges 63 extending away from the guides 58, and said diverging edges terminate in inward extending arcuate edges 64 that curve towards each other and are connected by a bulge or cam rise 65 that extends into the cam opening 56 between the curved edges 64 substantially in the manner shown in Fig. 2. The rocker arm 60 has a cam follower roller 66 rotatably mounted upon its free end and an annular groove 67 is made in the edge of said roller to engage the edges of the cam opening. The shapes of the arcuate cam edges 64 and their positions relative to the rise 65 form recesses on each side of said rise which the follower roller 66 will clear when the control shift lever has been moved from its neutral position to a forward or reverse position. The movement of the lever and its associated follower is arrested by a suitable stop (not shown) in the transmission. Rise 65 is also provided with a notch 65a into which roller 66 drops when the transmission is conditioned for neutral. The moving of the follower roller 66 toward either of these recesses is effected by the force of the clutch springs 45 that is transferred to the cam plate 54 through the medium of clutch release fingers 46, throw-out bearing 47, shift levers 48 and the coupling 51 which connects the latter levers to the cam plate. Also the force of the clutch springs is adapted to maintain the cam rise 65 in engagement with the follower roller 66 whenever the clutch and transmission gear assemblies are in their neutral positions.

When the control shift lever 24 is moved in either direction from neutral the fulcrum rod 25 will be given sufficient rotation to raise or lower the free end of the rocker arm 60 to permit the follower roller to ride off the cam rise 65 toward a recess at one side of said cam rise. The cam plate 54 during this action will have moved toward the left (Fig. 2) to one of the limits of its reciprocatory movement to cause the fork 48 of the clutch shift lever 49 to rotate about its pivot and thus permit clutch throw-out bearing 47 to move to the right under the influence of clutch release fingers 46 and compression springs 45. This action results in the movement of the pressure plate 44 into clutching engagement with the friction facings 43 and operatively connects the transmission drive shaft 9 to the shaft 26 of the prime mover, the driven shaft 5 being rotated in one direction or the other depending upon whether the control shift lever 24 has been moved from neutral to its forward or reverse position. Coupling of shaft 5 to gear 7 or to gear 6 for forward or reverse drive, respectively, will occur slightly in advance of engagement of the clutch 43, 44. In this manner a single shift lever controls the operation of the clutch and at the same time operates the blocker synchronizer to shift the gears of the transmission assembly to control the direction of rotation of the driven shaft 5. The clutch actuator springs 45 exert a pull upon the cam plate 54 so that the follower roller 66 is maintained in continuous contact with the cam rise, and when the roller is on the central portion of the cam rise the clutch will be inactive and the transmission assembly will be maintained in neutral. It may be noted from a consideration of Figs 1 and 2 that the lever 48 is fulcrumed on the lugs 50 to rotate about a pivot pin 68 and that the lower end of the lever at its pivotal connection to the coupling rod 51 will swing in an arc whereby, upon movement of the coupling rod 51 to the left by the lever 48 during engagement of the clutch by the springs 45 in either the forward or reverse positions of the control lever 24, as viewed in these figures, the pivotal connection 69 of the coupling rod 51 and lever 48 will also shift to the left and move in an upward direction. While this movement is slight, it will cause the extremity 53 of the coupling rod 51 to be slightly raised upwardly with the effect that, through the connection 55 of the coupling rod 51 with the plate 54, the left end of the plate will move in an upward direction, with the result that the plate 54 will be given a small rotational movement about the axis of the rock shaft. This rotational movement is permitted by the flexible diaphragm 70 surrounding the forked end 53 of the coupling rod 51. While the lever 48 is customarily mounted, as shown, in accordance with conventional clutch practice, it is possible that other mechanism may be disposed between the clutch release collar 47 and the coupling rod 51 which would be effective to cause movement of the coupling rod 51 solely along its longitudinal axis without movement of the left end of the rod 51 in an upward or downward direction, with the consequence that the plate 54 could not rotate about the rock shaft 25.

While this invention has been described in detail in its present preferred form or embodiment, it will be apparent to those skilled in the art, after understanding the invention, that various changes and modifications may be made therein without departing from the spirit or scope thereof. It is aimed in the appended claims to cover all such changes and modifications.

I claim:

1. In a power transmission having a power receiving shaft, a drive shaft, a friction clutch operatively connecting said shafts, said clutch having driving and driven members, springs for engaging the clutch members, a gear changing assembly connected to said drive shaft, a control lever for operating said gear changing assembly, a fulcrum rod secured to said control lever, a rocker arm secured to and movable with the fulcrum rod, the improvement which consists of a guide channel in the hub of said rocker arm, a plate reciprocably and rotatably supported in said guide channel, said plate being operatively connected to said clutch and urged in one direction by the clutch springs, and said plate having a cam opening embodying a cam rise and a recess at each side thereof, said rocker arm being adapted to be engaged with the cam rise to maintain the clutch in an inactive position in opposition to the clutch operating springs.

2. In a power transmission having a drive receiving shaft, a drive shaft, a friction clutch operatively connecting said shafts, said clutch having driving and driven members, springs for engaging the clutch members, a transmission gear shift assembly connected to said drive shaft and including a synchronizing clutch, a control lever, a rock shaft pivoting said control lever, the improvement which consists of a shift yoke secured to said rock shaft to operate the synchronizing clutch of said transmission gear shift assembly, a plate reciprocably and rotatably supported on said rock shaft and operatively connected to the friction clutch, said plate being urged in one direction by the friction clutch operating springs, a cam opening in said plate embodying a cam rise and a fall at each side thereof, a follower arm secured to and movable with said rock shaft, and a channel in the hub of said arm for guiding said plate, said arm having a portion disposed in said plate opening adapted to engage the cam rise to maintain the friction clutch in an inactive position in opposition to the friction clutch operating springs.

3. In a power transmission having a drive receiving shaft, a drive shaft, a friction clutch operatively connecting said shafts, said clutch having driving and driven members, springs for engaging the clutch members, a transmission gear assembly connected to said drive shaft and including a synchronizing clutch, a control lever, a rock shaft pivoting said control lever, the improvement which consists in a shift yoke secured to said rock shaft to operate the synchronizing clutch of said transmission gear shift assembly, a plate reciprocably and rotatably supported on said rock shaft and operatively connected to said friction clutch, said plate being urged in one direction by the friction clutch operating springs and having an opening providing therein a cam rise and a fall at each side thereof and a guide slot opposite said rise and falls, a follower arm secured to and movable with said rock shaft, and a channel in the hub of said arm for engaging the guide slot of said plate to guide the same, said arm having a portion disposed in said plate opening adapted to engage the cam rise to maintain the friction clutch in an inactive position in opposition to the friction clutch operating springs.

4. Actuating mechanism comprising, in combination, a rock shaft and support therefor, an arm secured to said rock shaft and rotatable therewith, a second arm, said second arm being mounted on said rock shaft for reciprocal and rotational movement, a cam rise in an opening in said second arm, and a follower secured to and rotatable with said rock shaft and adapted to be engaged with said cam rise.

5. Actuating mechanism comprising, in combination, a rock shaft and support therefor, an arm secured to said rock shaft and rotatable therewith, a plate mounted on said rock shaft for reciprocal and rotational movement, an opening in said plate providing therein a cam rise and a fall at each side thereof and a guide slot opposite said rise and falls, and a follower secured to and rotatable with said rock shaft and adapted to be engaged with said cam rise, said follower having a channel in its hub portion for engaging the guide slot of said plate to guide the same.

6. Actuating mechanism comprising, in combination, a rock shaft and support therefor, a controlling lever secured to said rock shaft to rotate the same, a plate reciprocably and rotatably supported on said rock shaft, loading means acting on said plate to urge it in one direction, an opening in said plate providing therein a cam rise and a fall at each side thereof and a guide slot, a follower arm secured to and movable with said rock shaft, and a channel in the hub portion of said arm for engaging the guide slot of said plate to guide the same, said follower arm having a portion disposed in said plate opening and adapted to engage with the cam rise to oppose said loading means.

7. Actuating mechanism comprising, in combination, a rock shaft and support therefor, an arm secured to said rock shaft and rotatable therewith, a second arm, said second arm being mounted on said rock shaft for reciprocal movement, a cam rise in an opening in said second arm, and a follower secured to and rotatable with said rock shaft and adapted to be engaged with said cam rise.

8. Actuating mechanism comprising, in combination, a rock shaft and support therefor, an arm secured to said rock shaft and rotatable therewith, a plate mounted on said rock shaft for reciprocal movement, an opening in said plate providing therein a cam rise and a fall at each side thereof and a guide slot opposite said rise and falls, and a follower secured to and rotatable with said rock shaft and adapted to be engaged with said cam rise, said follower having a channel in its hub portion for engaging the guide slot of said plate to guide the same.

9. Actuating mechanism comprising, in combination, a rock shaft and support therefor, a controlling lever secured to said rock shaft to rotate the same, a plate reciprocably supported on said rock shaft, loading means acting on said plate to urge it in one direction, an opening in said plate providing therein a cam rise and a fall at each side thereof and a guide slot, a follower arm secured to and movable with said rock shaft, and a channel in the hub portion of said arm for engaging the guide slot of said plate to guide the same, said follower arm having a portion disposed in said plate opening and adapted to engage with the cam rise to oppose said loading means.

ANO E. KILPELA.

REFERENCES CITED

The following references are of record in the file of this patent:

UNITED STATES PATENTS

| Number | Name | Date |
| --- | --- | --- |
| 257,939 | Gove | May 16, 1882 |
| 900,984 | Coe | Oct. 13, 1908 |
| 910,123 | Godfrey | Jan. 19, 1909 |
| 999,699 | Collins | Aug. 1, 1911 |
| 1,010,273 | Law | Nov. 28, 1911 |
| 1,197,917 | Dawson et al. | Sept. 12, 1916 |
| 1,778,970 | Cotta et al. | Oct. 21, 1930 |
| 2,091,557 | Montgomery | Aug. 31, 1937 |
| 2,245,815 | Peterson et al. | June 17, 1941 |
| 2,277,275 | Swartz | Mar. 24, 1942 |

FOREIGN PATENTS

| Number | Country | Date |
| --- | --- | --- |
| 368,135 | Great Britain | Mar. 3, 1932 |